July 10, 1934.  C. W. ARCHER  1,966,328
COMBINED CLUTCH AND BRAKE MECHANISM
Original Filed Aug. 20, 1928

Inventor
Carl W. Archer
By Frease and Bishop
Attorneys

Patented July 10, 1934

1,966,328

UNITED STATES PATENT OFFICE 1,966,328

COMBINED CLUTCH AND BRAKE MECHANISM

Carl W. Archer, Massillon, Ohio, assignor to The Massillon Implement Company, Massillon, Ohio, a corporation of Ohio Original application August 20, 1928, Serial No. 300,628. Divided and this application March 12, 1932, Serial No. 598,427

2 Claims. (Cl. 192—13)

The invention relates to tractors and is a division of my prior application Serial No. 300,628, filed August 20, 1928.

The object of the improvement is to provide means for simultaneously throwing out the clutch and applying the brake in order to instantaneously stop the tractor whenever desired.

Figure 1:
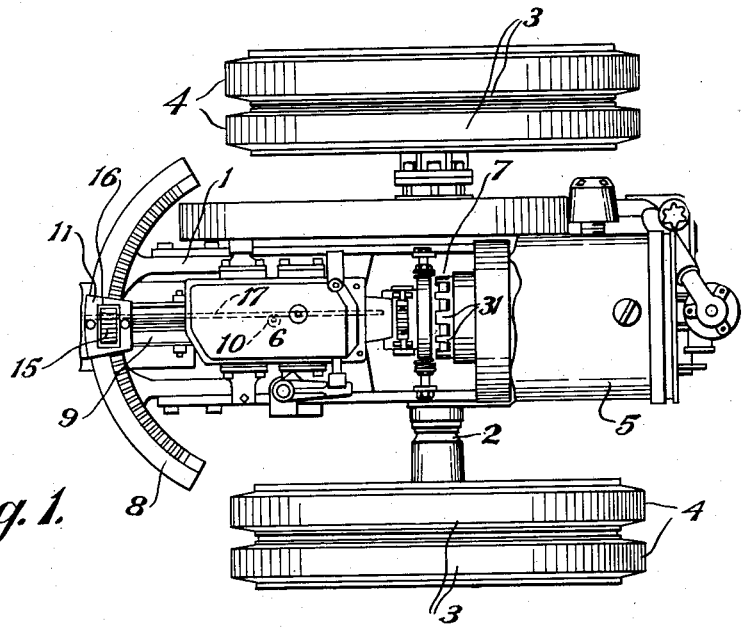
Figure 2:
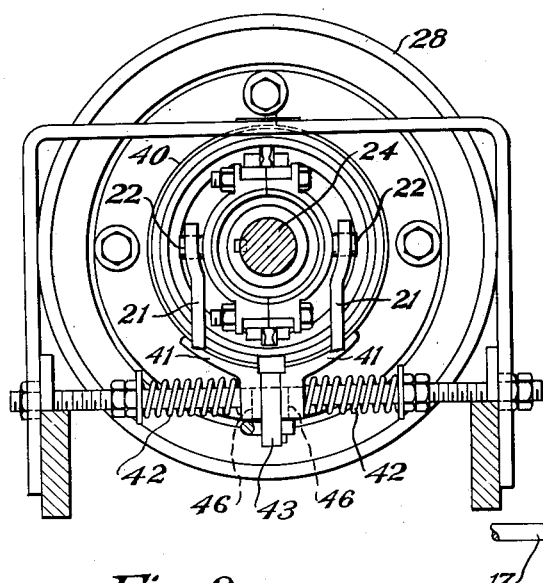
Figure 3:
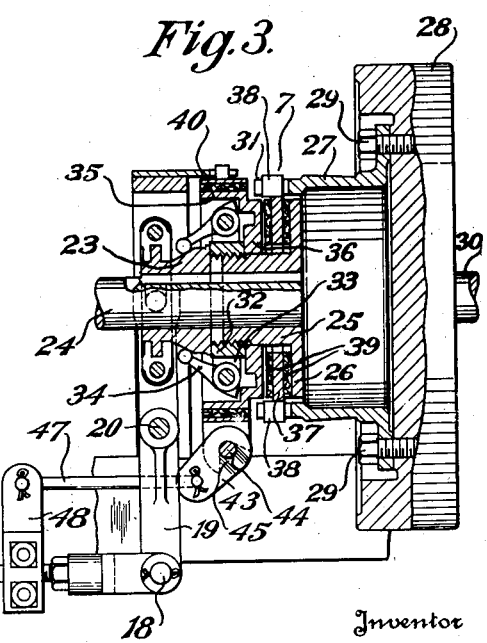

The above, together with other objects which will be apparent as the invention is described, may be accomplished by constructing the improved mowing machine in the manner illustrated in the accompanying drawing, in which Figure 1 is a top plan view of the improved tractor provided with the clutch and brake mechanism to which the invention pertains;

Fig. 2, a sectional elevation of the brake and clutch mechanism on a large scale;

Fig. 3, a longitudinal section of the same; and

Figure 4:
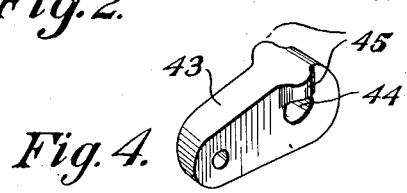

Fig. 4, a detached perspective view of the cam which operates the brake.

Similar numerals refer to similar parts throughout the drawing.

The tractor, which may be of any desired type, is mounted upon a suitable frame indicated generally at 1 and provided with the axle 2 which may be located transversely through the central portion of the frame, traction wheels 3, preferably of the dual type as shown, being fixed upon the axle, and preferably provided with rubber tires, as shown at 4. The engine is shown generally at 5 and may be operatively connected to the gears (not shown) in the gear housing 6 through a clutch indicated generally at 7, and which will be later described in detail.

A gear segment 8 may be fixed to the rear end of the tractor frame, and the drawbar 9, carried by the implement to be drawn by the tractor, may be pivotally connected to the tractor frame, concentric with said segment, as by the bolt 10.

This drawbar may be provided with the bracket portion 11 in which is journaled a steering shaft (not shown) upon which is mounted a pinion 15 located within the slot 16 of the bracket 11 and engaging the gear segment 8, whereby turning of the steering shaft will cause the tractor to be turned upon the pivot 10 with reference to the implement drawn by the tractor.

A link 17 may extend rearward from the tractor to a convenient point for operation from the implement drawn by the tractor, the forward end of the link being connected to the brake and clutch mechanism, as best shown in Fig. 3.

The forward end of this link is pivotally connected as at 18 to the lower end of a lever 19 fulcrumed as at 20 and having the forked yoke 21 engaging pins 22 upon the cone 23 which is slidably mounted upon the shaft 24 leading to the gear housing.

A collar 25 is fixed upon the shaft 24 and provided with the disk flange 26 which is rotatable within the open end of the crown 27 connected to the flywheel 28 of the engine as by the bolts 29, this flywheel being mounted on the crankshaft 30 of the engine.

The crown 27 is provided at its free edge with a plurality of spaced teeth 31. A collar 32 may be threaded or otherwise rigidly fixed upon the collar 25, and is provided with ears 33 upon which are fulcrumed the lever fingers 34 for engagement with the brake drum 35 having the hub portion 36 slidably mounted upon the collar 25.

A disk 37 is located between the flange 26 and the hub portion 36 of the brake drum, and provided around its periphery with the teeth 38 for slidable engagement with the teeth 31 of the crown 27. This disk is provided upon each side with a friction face 39 for engagement with the flange 26 and the brake drum hub 36.

A split brake band 40 surrounds the brake drum and is provided with the brackets 41 at its ends, the coil spring or springs 42 being provided for normally urging the brackets toward each other to clamp the brake band upon the drum.

For the purpose of holding the brackets apart, against the tension of the spring or springs 42, to normally retain the brake band loose upon the drum, a cam lever 43 is pivoted as at 44 between the brackets 41. This cam lever is provided with the cam surfaces 45 adapted to be received in sockets 46 in the brackets to permit the spring or springs 42 to clamp the brakeband tightly upon the brake drum.

The cam lever 43 is connected to the clutch operating link 17 as by the link 47 and bracket 48, said link being pivotally connected to the free end of the cam lever and to the bracket 48 which is rigidly fixed upon the link 17.

The lever fingers 34 engage the periphery of the cone 23 whereby sliding of the cone away from the collar 32 will operate the lever fingers to move the brake drum toward the flange 26, clamping the friction disk 37 therebetween and causing the shaft 24 to be rotated through the shaft 30. At the same time, the cam lever 43 will be rocked into position to bring the cam lugs 45 thereon out of the recesses 46 of the brackets 41, spreading the brake band 40 and releasing the brake.

By operating the link 17 in the opposite direction, it will be seen that the lever fingers 34 will ride down toward the smaller end of the cone 23, opening the clutch, while at the same time the lugs 45 of the cam lever will be received within the recesses 46 of the brackets 41, permitting the spring or springs 42 to force the ends of the brake band together and clamp the same tightly upon the brake drum.

It will thus be seen that the clutch is released and the brake applied simultaneously through the operation of a single operating lever or pedal, of any desired construction, which may be operatively connected to the link 17, thus permitting the tractor to be instantaneously stopped at any desired time.

I claim:

1. A tractor including a motor, traction wheels, a shaft upon the motor, a second shaft operatively connected to the traction wheels, a disk fixed upon the second named shaft, a friction disk operatively connected to the motor shaft and movable with reference to said fixed disk, a brake drum slidable with reference to the second named shaft and adapted to clamp said friction disk between the fixed disk and brake drum, a brake cooperating with said brake drum, and means for simultaneously moving the brake drum away from the friction disk and applying said brake to the brake drum.

2. A tractor including a motor, traction wheels, a shaft upon the motor, a second shaft operatively connected to the traction wheels, a disk fixed upon the second named shaft, a crown operatively connected to the motor shaft and provided with teeth, a friction disk located adjacent to said fixed disk and movable with reference thereto and having peripheral teeth engaging the teeth of the crown, a brake drum slidable with reference to the second named shaft, and adapted to clamp said friction disk between the fixed disk and brake drum, a brake cooperating with said brake drum, and means for simultaneously moving the brake drum away from the friction disk and applying said brake to the brake drum.

CARL W. ARCHER.